(12) United States Patent
Hagedorn et al.

(10) Patent No.: US 9,670,989 B2
(45) Date of Patent: *Jun. 6, 2017

(54) DRIVEN HATCH ARRANGEMENT FOR A MOTOR VEHICLE

(71) Applicant: IMS GEAR SE & CO. KGaA, Donaueschingen (DE)

(72) Inventors: Heinz Gert Hagedorn, Rottweil (DE); Matthias Kieninger, Unterkirnach (DE)

(73) Assignee: IMS GEAR SE & CO. KGaA, Donaueschigen (DE)

( * ) Notice: Subject to any disclaimer, the term of this patent is extended or adjusted under 35 U.S.C. 154(b) by 316 days.

This patent is subject to a terminal disclaimer.

(21) Appl. No.: 14/339,070

(22) Filed: Jul. 23, 2014

(65) Prior Publication Data
US 2015/0105207 A1  Apr. 16, 2015

(30) Foreign Application Priority Data

Oct. 14, 2013 (EP) ..................................... 13188489
Nov. 13, 2013 (EP) ..................................... 13192723

(51) Int. Cl.
*F16H 1/28* (2006.01)
*E05F 15/614* (2015.01)
(Continued)

(52) U.S. Cl.
CPC .............. *F16H 1/28* (2013.01); *E05F 15/611* (2015.01); *E05F 15/614* (2015.01);
(Continued)

(58) Field of Classification Search
None
See application file for complete search history.

(56) References Cited

U.S. PATENT DOCUMENTS 4,825,727 A * 5/1989 Komuro ................. F16H 1/227
74/413
5,624,000 A  4/1997 Miller
(Continued)

FOREIGN PATENT DOCUMENTS

DE 197 11 423 C1 9/1998
JP 2005-213 762 A 8/2005
(Continued)

OTHER PUBLICATIONS

Search report from corresponding Korean patent application 10-2014-0136786, May 9, 2016.
(Continued)

*Primary Examiner* — Edwin A Young
(74) *Attorney, Agent, or Firm* — Juneau & Mitchell (57) ABSTRACT

A driven hatch arrangement is provided, particularly a rear hatch arrangement, for a motor vehicle with a hatch and with a hatch drive for opening and/or closing the hatch, with the hatch drive comprising a motor with a motor shaft and a motor pinion and at least one planetary gear with a sun gear, planetary carriers with planetary rolling elements arranged on bearing pins, and an annulus, with the sun wheel of the planetary gear being formed by the motor pinion and a driven shaft being driven via the planetary gear, in which the motor pinion is slid onto the motor shaft.

8 Claims, 5 Drawing Sheets

(51) Int. Cl.
    *F16H 57/00*     (2012.01)
    *E05F 15/611*     (2015.01)

(52) U.S. Cl.
    CPC ...... *F16H 57/0018* (2013.01); *E05Y 2201/72* (2013.01); *E05Y 2900/546* (2013.01)

(56) References Cited

U.S. PATENT DOCUMENTS

| | | | | |
|---|---|---|---|---|
| 5,679,089 A | * | 10/1997 | Levedahl | F16H 1/46 475/330 |
| 7,556,580 B2 | | 7/2009 | Saito | |
| 9,068,646 B2 | * | 6/2015 | Hagedorn | E05F 15/611 |

FOREIGN PATENT DOCUMENTS

| | | |
|---|---|---|
| KR | 10-2007-0067358 | 6/2007 |
| KR | 10-2009-0059395 | 6/2009 |
| WO | WO 2012/159711 | 11/2012 |

OTHER PUBLICATIONS

CIPO Office Action from corresponding Chinese patent application 2014 1044 9176.6, Jul. 22, 2016.

\* cited by examiner

Prior Art

Prior Art

DRIVEN HATCH ARRANGEMENT FOR A MOTOR VEHICLE

CROSS REFERENCE TO RELATED APPLICATIONS

This patent application claims priority European Patent Application 13 188 489.2, filed on Oct. 14, 2013 and European Patent Application 13 192 723.8, filed on Nov. 13, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a driven hatch arrangement for a motor vehicle, particularly for a rear hatch.

Background of the Invention

The current state of knowledge is as follows.

The requirements of the market with regards to a comfortable use of a motor vehicle continue to increase. This is particularly discernible from the fact that for a plurality of motions of components of a motor vehicle the manual adjustment of positions is replaced by a particularly electrically driven motion or is at least partially supported by a motor or that such a replacement is at least optional. Some examples in which this process is already rather advanced are the adjustment of the windows, the seats, or the exterior mirrors of a motor vehicle.

Recently, there have been increased attempts to create an option for a driven motion of parts arranged at the motor vehicle in a foldable fashion, particularly the rear hatch of a vehicle. Such driven hatch arrangements are known for example from DE 40 07 162 A1, WO 00/36259 A1, DE 40 41 480 A1, and DE 20 2011 106 149 U1.

Motors and transmissions used in the context with driven hatch arrangements are subject to a number of restrictions, particularly with regards to the structural space available, which particularly lead on the one hand that relatively extensive and thus expensive drive solutions must be selected and on the other hand here an increased risk may arise that the transmission jams due to the forces acting here, which additionally may vary depending on the position of the hatch, because frequently the position of the hatch drive varies in reference to the ground, depending on the present position of said hatch.

The objective of the invention comprises to provide a driven hatch arrangement with a hatch drive, which is produced in a cost-effective fashion and furthermore jams less easily than hatch drives of prior art. Here, the invention starts with the embodiment of an assembly comprising an electric engine and a reduction gear unit, which is universal as a drive assembly for the most various mechanisms known from prior art to execute the folding motion, particularly well-suited for the use in the context with spindle drives, such as known from DE 20 2011 106 149 U1. Due to the fact that the precise embodiment of the respectively driven mechanism is irrelevant for achieving the advantages according to the invention, by which the driving motion is transferred to the rear hatch, reference is made to prior art for the concrete design thereof.

BRIEF SUMMARY OF THE INVENTION

In a preferred embodiment, a driven hatch arrangement, comprising a rear hatch arrangement for a motor vehicle with a hatch and with a hatch drive for opening and closing the hatch, with the hatch drive comprising a motor with a motor shaft and a motor pinion and at least one planetary drive with a sun gear, planetary carriers with planetary rolling elements arranged on bearing pins, and an annulus, with the sun gear of the planetary drive being formed by the motor pinion and with a driven shaft being driven by the planetary drive, wherein the motor pinion is slid onto the motor shaft, and wherein the driven shaft is formed in one piece with the planetary carrier including bearing pins for the planetary rolling elements.

BRIEF DESCRIPTION OF THE DRAWINGS

FIG. 4b is a line drawing evidencing a cross-section of the second planetary carrier shown in FIG. 4a.

FIG. 5b is a line drawing evidencing a cross-section of the planetary carrier shown in FIG. 5a.

DETAILED DESCRIPTION OF THE INVENTION

The driven hatch arrangement according to the invention for a motor vehicle is particularly suited for providing a driven rear hatch. It includes a hatch and a hatch drive for opening and/or closing the hatch, with the hatch drive comprising a motor with a motor shaft and a motor pinion and at least one planetary gear with a sun gear, planetary carriers with planetary rolling elements arranged on bearing pins, and an annulus. Here, the sun gear of at least one planetary gear is formed by a motor pinion and a driven shaft is driven by at least one planetary gear.

The driven shaft may be a component of at least one planetary gear, however it may also be driven with another transmission being interposed, which particularly may also be embodied as a planetary gear.

It is essential for the invention that the motor pinion is slid only onto the motor shaft, while according to prior art it had been fastened at the motor shaft. This way, on the one hand the fastening of the motor pinion is unnecessary as an assembly step, which saves costs, on the other hand any limitations regarding the selection of the material of the motor pinion by the type of fastening in the space are omitted, and finally it is here also securely avoided that the operating behavior of the hatch drive is compromised by any changes of the position at which the motor pinion is arranged.

As a matter of form it shall be mentioned that the hatch arrangement furthermore will usually also include a drive mechanism arranged between the hatch drive and the hatch, by which the force and/or motion provided by the hatch drive is transferred into a folding motion of the hatch. As already mentioned above, such drive mechanisms for a hatch arrangement are known from prior art in various embodiments, and for the technical implementation of the invention yielding an improvement of the hatch drive the concrete embodiment of the drive mechanism is irrelevant, rather the invention can be used in combination with all drive mechanisms of prior art.

In a particularly preferred further development of the invention the motor pinion is arranged displaceable in the axial direction of the motor shaft such that the motor pinion, during operation of the hatch drive, can be displaced in the axial direction in reference to the motor shaft, which surprisingly leads to a considerably reduced risk of jamming in reference to prior art, as recognized by the inventors.

This embodiment of the invention can here be further developed such that the ability of displacement of the motor pinion in the axial direction of the motor shaft towards a housing of the motor and/or towards the planetary carrier of the planetary gear is limited by a stop. This way, an operating range can be defined in which it is ensured that the motor pinion used as the sun gear of at least one planetary gear engages the planetary rolling element in the desired fashion.

Here, it is particularly advantageous to realize the stop, limiting the ability of the motor pinion to move in the direction towards the housing of the motor, at the motor, for example as a structure formed at the motor housing or at the motor shaft, and/or to realize the stop, limiting the ability of the motor pinion to move in the direction towards the planetary carrier of the planetary gear, as a structure provided at the planetary carrier.

For reasons of costs it is particularly preferred for the motor pinion to be a plastic pinion. As already mentioned above, by omitting the previously necessary connecting of the motor pinion to the motor shaft here materials can be used, which in prior art due to their features proved to be difficult with regards to a connection to the motor shaft commonly produced from metal, for example due to poor availability of adhesives, problems with generating metal-to-metal connections caused by the material combination, or because the material of the pinion is so soft that it cannot withstand a compression step without any undesired deformations developing. Such problems were particularly given in the context with the use of plastic pinions. However, metallic or ceramic pinions may also be used, particularly those produced by MIM (metal injection molding) or CIM (ceramic injection) methods.

The invention can be used particularly advantageously when the motor pinion shows helical gearing. Namely here, in pinions with helical gearing engaging each other, forces can develop in a direction axial in reference to the motor shaft. These forces can now be compensated by a displacement of the motor pinion only slid onto the motor shaft but not fastened thereat, which prevents any jamming of the transmission in a particularly secure fashion.

When the driven shaft is formed in one piece with a planetary carrier including bearing pins for planetary roller elements, here additional production costs can be saved because the assembly of respective individual components is avoided. In particular any axial securing at the driven side is unnecessary and can be waived, here. This way, concretely on the one hand the assembly of a circlip is omitted, which leads to cost savings, while on the other hand costs for tools can also be lowered, because no bearing needs to be provided for such a circlip so that additionally any sliders for a radial deformation are no longer necessary, either.

This applies particularly when the driven shaft embodied in one piece including the planetary carrier and the bearing pin for the planetary roller elements is produced with a molding production method. Here, plastic may be used, however metallic or ceramic parts may also be produced by the use of MIM (metal injection molding) or CIM (ceramic injection) methods. The use of such molding production methods also leads to the significant advantage in allowing that the profile of the hollow shaft can be produced closed at the driven section. This lastingly reduces the risk of contamination, approaching zero.

Furthermore, it proves advantageous that due to this measure any bearing pins no longer need to be separately inserted into the planetary carrier and then fastened here, because even slight tilting of these bearing pins in reference to each other can considerably increase the risk of the transmission jamming, which is now avoided.

The cost savings are achieved particularly when the driven shaft embodied in one piece including the planetary carrier and the bearing pins for the planetary rolling elements are made from plastic, based on a metallic powder or based on a ceramic powder, particularly by an injection molding process, such as plastic molding, PIM, or CIM.

A particularly advantageous further development of the invention provides that the bearing pins of the planetary carrier project in the direction towards the motor beyond the roller elements arranged on the bearing pins. This way, by waiving the criterion of minimizing structural space, which in prior art used to largely determine the concrete construction of the hatch drive, wiggle room is generated for the motor pinion in the axial direction in reference to the motor shaft, which ensures that the motor pinion is not jamming. Simultaneously here radial forces, e.g. occurring in a spindle drive for the hatch, can also be compensated by the projecting bearing pins.

It is particularly beneficial for the motor pinion to be secured against any radial distortion in reference to the motor shaft by a form-fitting connection with at least one section of the motor shaft. This can be particularly realized such that the cross-section of the end section of the motor shaft facing the planetary gear, starting with a circular cross-section, is modified such that the material is removed which is located at a side of a secant of the circle. This section is therefore processed, starting with a cylindrical form, such that a plane is generated extending parallel in reference to the axis of the motor shaft. This form is called "D-shaped." Then a sliding opening is provided in the motor pinion, with its cross-section being adjusted to the cross-section of the modified section of the motor shaft.

DETAILED DESCRIPTION OF THE FIGURES

Figure 1:
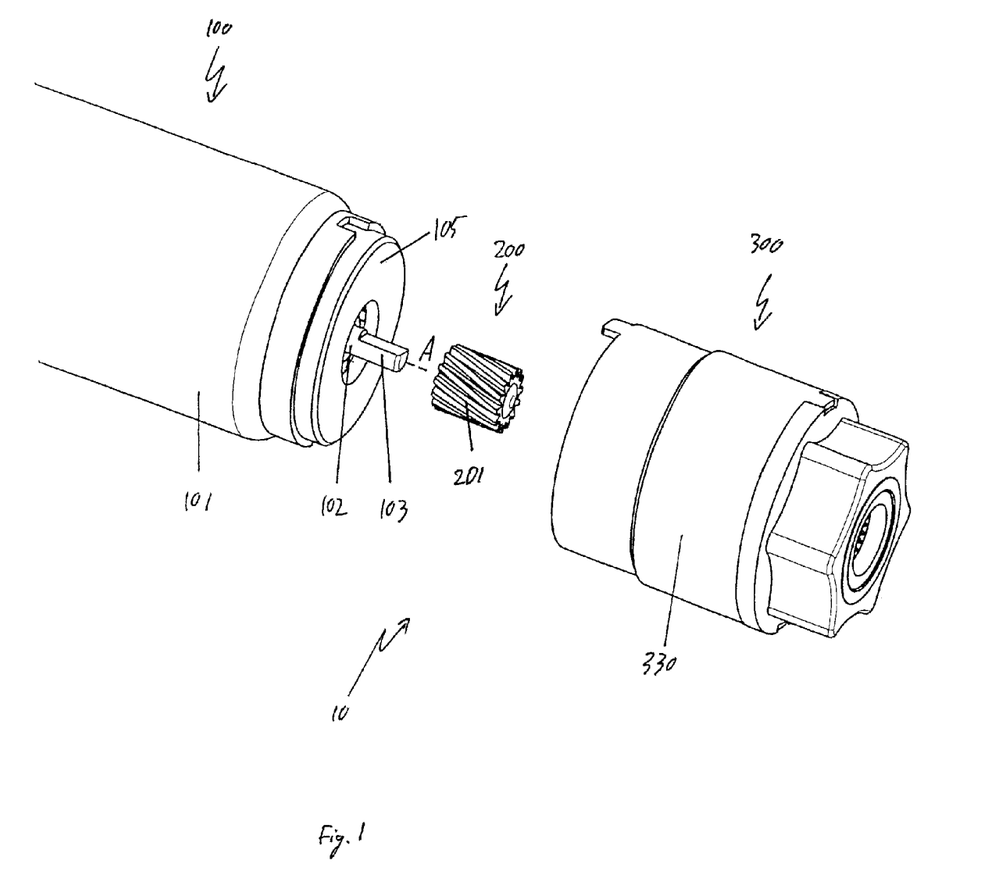
FIG. 1 is a line drawing evidencing an exploded illustration of the components of a hatch drive.

The hatch drive 10 shown in FIG. 1 comprises as components a motor 100 with a motor housing 101 and a motor housing lid 105 fixed at said motor housing 101 and a motor shaft 102 with a rotary axis A, a motor pinion 200, in the assembled state of the hatch drive 10 slid onto the motor shaft 102, with helical gears 201 and a transmission assembly 300. Preferably the motor pinion 200 is produced from plastic, however, e.g. metallic or ceramic pinions may also be used, particularly produced using MIM (metal injection molding) or CIM (ceramic injection) methods.

As further discernible from FIG. 1, the motor shaft 102 shows on its side facing the transmission assembly 300 a section 103 with a D-shaped cross-section, thus a section with its form being produced by generating a planar surface 104 extending parallel in reference to the rotary axis A of the motor shaft 102. The motor pinion 200 shows a recess 203, not discernible due to the direction of view selected in FIG. 1, which is at least adjusted in a section 202 to the D-shaped form of the section 103 so that a form-fitting connection develops, which secures the motor pinion 200 from any radial distortion in reference to the motor shaft 102.

Figure 2:
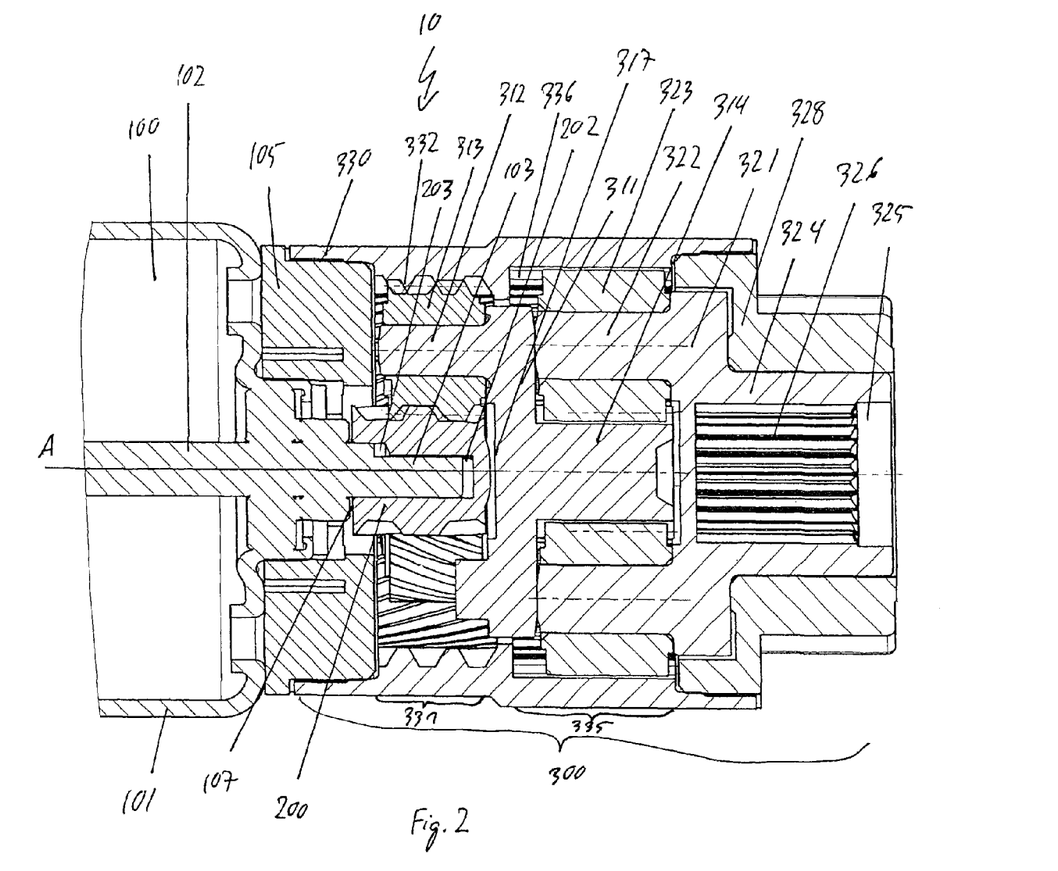
FIG. 2 is a line drawing evidencing a cross-section through an exemplary embodiment of a hatch drive.

The design of the transmission assembly 300 and the functionality of the entire hatch drive 10 is particularly clearly discernible from the cross-section according to FIG. 2. The transmission assembly 300 is embodied as a two-step planetary gear, which is accepted in a housing 330, and is fixed in a torque-proof fashion at the motor housing 101 or the motor housing the lid 105.

In the embodiment of the transmission assembly 300 shown here the first planetary gear shows a helical gearing, while the gears of the pinions of the second planetary gear extend parallel in reference to the axis of rotation.

The annulus of the first planetary gear is here formed by a gearing 332 arranged in a section 331 of the interior of the housing 330, the sun gear of the first planetary gear is formed by the motor pinion 200.

Figure 3:
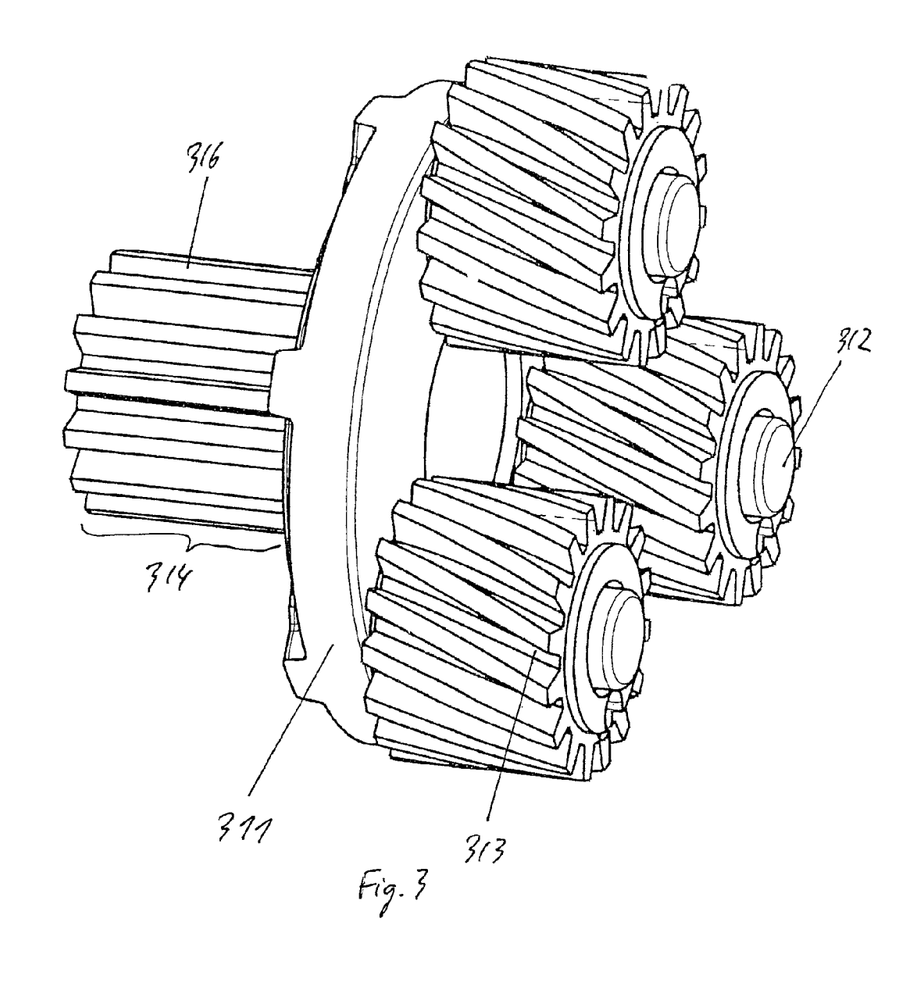
FIG. 3 is a line drawing evidencing a top view of a first planetary carrier of the exemplary embodiment shown in FIG. 2 with planetary rolling elements arranged thereat.

Further, the first planetary gear shows a first planetary carrier 311, shown separately in FIG. 3, with a bearing pin 312 formed here in one piece, on which planetary rolling elements 313, particularly embodied as planetary gears, are arranged in a rotary fashion. The planetary rolling elements 313 can here optionally be fixed on the bearing pins 312, particularly e.g. with circlips, or at least limited in its motion parallel in reference to the longitudinal axis of the bearing pin 312. Here it must be emphasized that the bearing pins 312 project, in the direction towards motor 100, beyond the rolling elements 313 arranged on the bearing pints 312, as particularly clearly discernible from the illustration according to FIG. 3.

A first driven shaft 314 is also formed in one piece at the planetary carrier 311, which is formed by an external gearing 316 as a pinion and forms the sun gear of the second planetary gear.

Figure 4A:
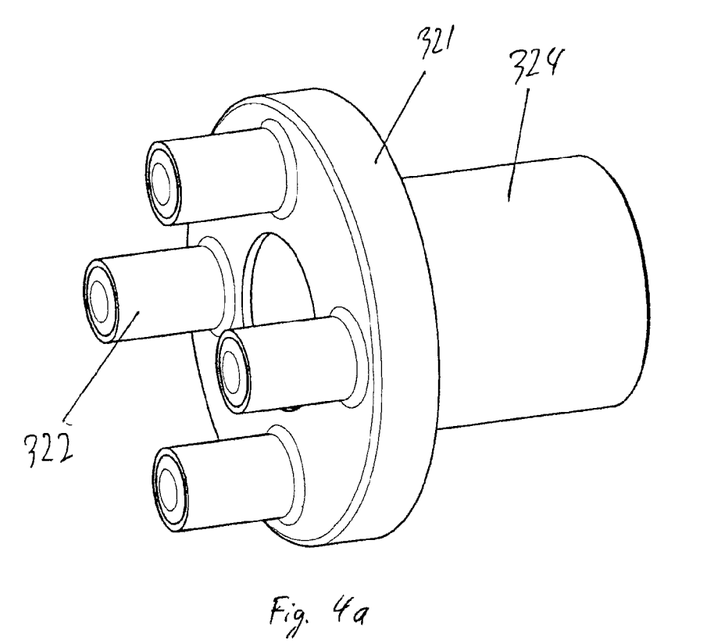
FIG. 4a is a line drawing evidencing a top view of a second planetary carrier of the exemplary embodiment shown in FIG. 3.
Figure 4B:
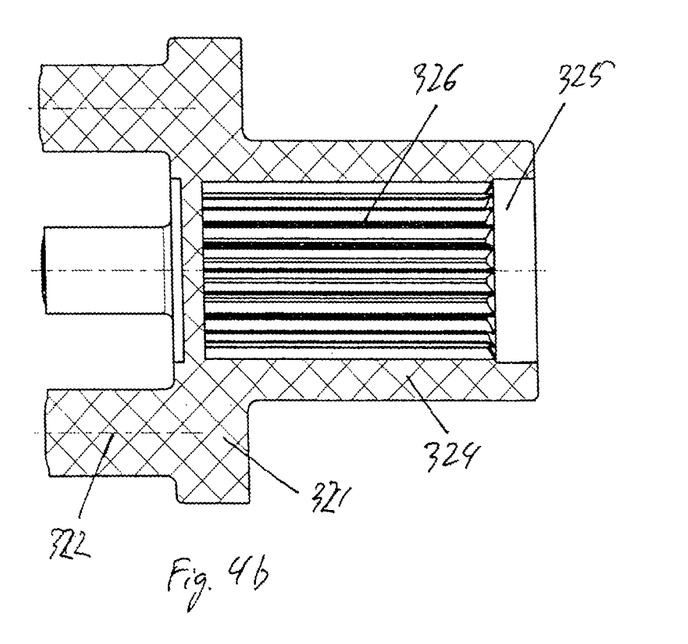

Other components of the second planetary gear are the second planetary carrier 321 shown in FIGS. 4a and 4b with bearing pins 322 formed thereat in one piece, on which planetary rolling elements 323 are arranged in a rotational fashion, which in particular may be embodied as planetary gears, and with a second driven shaft 324, also formed in one piece at the second planetary carrier 321, a hollow space 325 as discernible in FIG. 4b, with internal gears 326, as well as the second annulus formed by gears 336 arranged in a section 335 of the interior of the housing 330. The second planetary carrier 321 is secured by a transmission cover 328, which e.g. may be fixed at the housing 330, secured against any axial displacement.

Figure 5A:
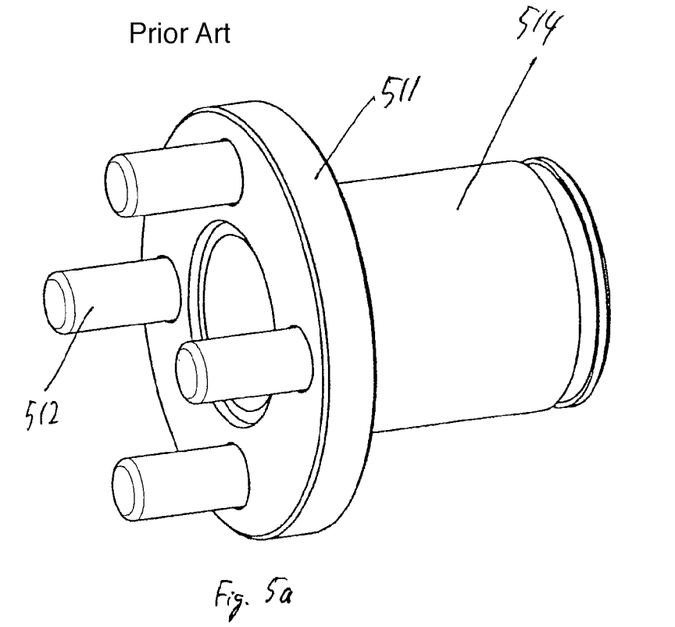
FIG. 5a is a line drawing evidencing a top view of a planetary carrier according to prior art.
Figure 5B:
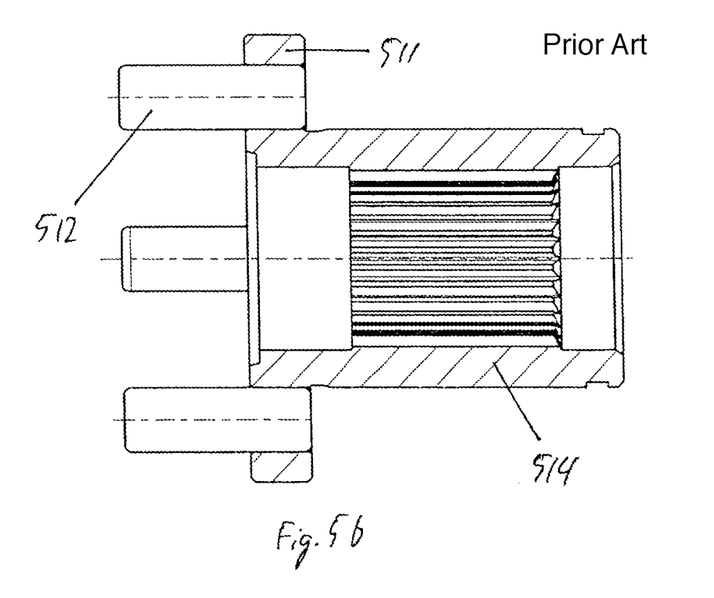

The planetary carriers 311 and/or 321 shown in FIGS. 3, 4a, and 4b, in which respectively the bearing pins 312 and/or 322 and the driven shafts 314 and/or 324 are embodied in one piece including gears 316 and/or 326 formed thereat, represent an essential improvement in reference to planetary carrier arrangements known from prior art, as shown in FIGS. 5a and 5b. Although planetary carriers 511 of prior art already show a driven shaft 514 connected in one piece with the planetary carrier 511, but the bearing pins 512 were provided as separate components and inserted into the planetary carrier 511, particularly fixed by way of compression. As a consequence, not only a plurality of operating steps was necessary for producing the assembly, but minor deviations of the alignment of the bearing pins from the target position resulted in a tilting of the planetary rolling elements arranged thereon and a corresponding increase of the trend of the planetary gear for jamming.

Additionally, the use of driven assemblies produced by molded production methods, offering price and weight advantages, was not possible, particularly driven assemblies produced entirely from plastic by CIM or PIM-methods.

Once more referring to FIG. 2, now it shall be briefly described what happens when the motor 100 is operated. The motor shaft 102 rotates about its axis of rotation A, causing the motor pinion 200 also to rotate about the axis of rotation A due to its form-fitting connection to the section 103 of the motor shaft 102. The helically geared planetary rolling elements 313, engaging the helical gears 201 of the motor pinion 200, are driven by the motor pinion 200 serving as the sun gear and run on the annulus of the first planetary gear, which is formed by the gearing 332 arranged in a section 331 of the interior of the housing 330, causing the first planetary carrier 311 with the first driven shaft 314 arranged thereat to be set in rotation because the housing 330 is connected to the motor 100 in a torque-proof fashion.

As already mentioned, the external gearing 316 provided at the driven shaft 314 forms the sun gear of the second planetary gear. It engages the planetary rolling elements 323 and sets it into rotation, causing it to engage the annulus of the second planetary gear, which is formed by gearing 336 arranged in a section 335 of the interior of the housing 330. Accordingly, since the housing 330 is connected to the motor 100 in a torque-proof fashion, the second planetary carrier 321 with the first driven shaft 324 arranged thereat is set into rotation, allowing to drive the drive mechanism, not shown, which transfers this motion into an opening or closing movement of the hatch.

Here it is particularly essential that the motor pinion 200 is not arranged on the motor shaft 102 in a compressed fashion or otherwise fixed as in prior art, but is slid onto the motor shaft 102. In other words, the motor pinion 200 is located in a sliding seat, thus arranged mobile in the axial direction of the motor shaft 102, which is predetermined by the rotary axis A, so that it can shift between a first stop 107 at the motor side, provided at the motor shaft 102, and a second stop 317 at the transmission side, arranged at the first planetary carrier 311. By the play created in this fashion for the motor pinion 200 the risk for any jamming of the transmission assembly 300 can be significantly reduced.

LIST OF REFERENCE NUMBERS

10 Hatch drive
100 Motor
101 Motor housing
102 Motor shaft
103 Section
105 Motor housing lid
107 Stop
200 Motor pinion
201 Helical gearing
202 Section 203 Recess
300 Transmission assembly
311, 321 Planetary carrier
312, 322 Bearing pin
313, 323 Planetary rolling element
314, 324 Driven shaft
316 External gear
317 Stop
325 Hollow space
326 Internal gearing
328 Transmission cover
330 Housing
331, 335 Section
332, 336 Gearing
511 Planetary carrier
512 Bearing pin
514 Driven shaft
A Axis of rotation The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A driven hatch arrangement, comprising a rear hatch arrangement for a motor vehicle with a hatch and with a hatch drive for opening and closing the hatch, with the hatch drive comprising a motor with a motor shaft and a motor pinion and at least one planetary drive with a sun gear, planetary carriers with planetary rolling elements arranged on bearing pins, and an annulus, with the sun gear of the planetary drive being formed by the motor pinion and with a driven shaft being driven by the planetary drive, wherein the motor pinion is slid onto the motor shaft, and wherein the driven shaft is formed in one piece with the planetary carrier including bearing pins for the planetary rolling elements.

2. The driven hatch arrangement of claim 1, wherein the motor pinion is displaceably arranged in the axial direction of the motor shaft.

3. The driven hatch arrangement of claim 2, wherein the ability of displacement of the motor pinion in the axial direction of the motor shaft is limited by a stop in the direction towards a housing of the motor and/or in the direction towards the planetary carrier of the planetary gear.

4. The driven hatch arrangement of claim 1, wherein the motor pinion is a plastic pinion.

5. The driven hatch arrangement of claim 1, wherein the motor pinion comprises helical gears.

6. The driven hatch arrangement of claim 1, wherein the driven shaft is formed in one piece including the planetary carrier and the bearing pins for the planetary rolling elements are produced in a molding process and made from plastic or produced by metal injection molding or ceramic injection processes.

7. The driven hatch arrangement of claim 1, wherein the bearing pins of the planetary carrier projects in the direction towards the motor beyond planetary rolling elements arranged on the bearing pins.

8. The driven hatch arrangement of claim 1, wherein the motor pinion is secured by a form-fitting connection to at least a section of the motor shaft against a radial distortion in reference to the motor shaft.

* * * * *